United States Patent
Suganuma

[11] Patent Number: 5,940,125
[45] Date of Patent: Aug. 17, 1999

[54] CORRECTING OFFSET LEVEL USING A PROPORTIONAL DISTRIBUTION OF A DIFFERENCE IN DARK CURRENT LEVELS IN A LINE IMAGE SENSOR

[75] Inventor: Atsushi Suganuma, Minamiashigara, Japan

[73] Assignee: Fuji Photo Film Co., Ltd., Kanagawa-ken, Japan

[21] Appl. No.: 08/848,638

[22] Filed: Apr. 29, 1997

[30] Foreign Application Priority Data

May 1, 1996  [JP]  Japan .................................. 8-111013

[51] Int. Cl.$^6$ ........................................... H04N 9/64
[52] U.S. Cl. ................................................. 348/243
[58] Field of Search .................. 348/241, 243, 348/282, 283, 250, 311, 315, 322, 323, 324; 358/463

[56] References Cited

U.S. PATENT DOCUMENTS

| | | | |
|---|---|---|---|
| 3,904,818 | 9/1975 | Kovac | 348/243 |
| 5,181,118 | 1/1993 | Kimura | 348/243 |
| 5,272,536 | 12/1993 | Sudo et al. | 348/243 |
| 5,376,966 | 12/1994 | Takase | 348/243 |

*Primary Examiner*—Wendy Garber
*Assistant Examiner*—Alicia M Harrington
*Attorney, Agent, or Firm*—Sughrue, Mion, Zinn, Macpeak & Seas, PLLC

[57] ABSTRACT

An offset level of a pixel signal outputted from a linear image sensor having a pixel transfer array disposed along a photodetector is corrected by outputting as empty transfer levels signal levels produced from empty pixel transfer array elements when transfer clock pulses are successively applied to the pixel transfer array after one line of pixel signals is transferred from the photodetector through the pixel transfer array. To determine a correcting quantity of a given pixel of a predetermined line, a difference is produced by subtracting an average empty transfer level of a line preceding the predetermined line from an average empty transfer level of the predetermined line. A proportional distribution of the difference from a first pixel to an nth pixel to be corrected with respect all pixels of the predetermined line is determined. The proportional distribution is added to the empty transfer level of the line preceding the predetermined line. Since the average empty transfer levels of the predetermined line and the preceding line are used, the offset level can accurately be corrected.

16 Claims, 11 Drawing Sheets

SCANNING RANGE

CORRECTING OFFSET LEVEL USING A PROPORTIONAL DISTRIBUTION OF A DIFFERENCE IN DARK CURRENT LEVELS IN A LINE IMAGE SENSOR

BACKGROUND OF THE INVENTION

1. Field of the Invention

The present invention relates to a method of and an apparatus for correcting the offset level of a linear image sensor such as a CCD (charge-coupled device) in an image reading system.

2. Description of the Related Art

Image reading systems operate by applying illuminating light to a subject placed on a subject table, guiding light representing image information carried by the subject as reflected or transmitted light to a focusing optical system, and photoelectrically reading the light with a linear image sensor such as a CCD or the like. The subject is read in a main scanning direction by the linear image sensor while at the same time the subject is moved relatively to the linear image sensor in an auxiliary scanning direction that is substantially perpendicular to the main scanning direction, so that two-dimensional image information can be produced.

Figure 9:
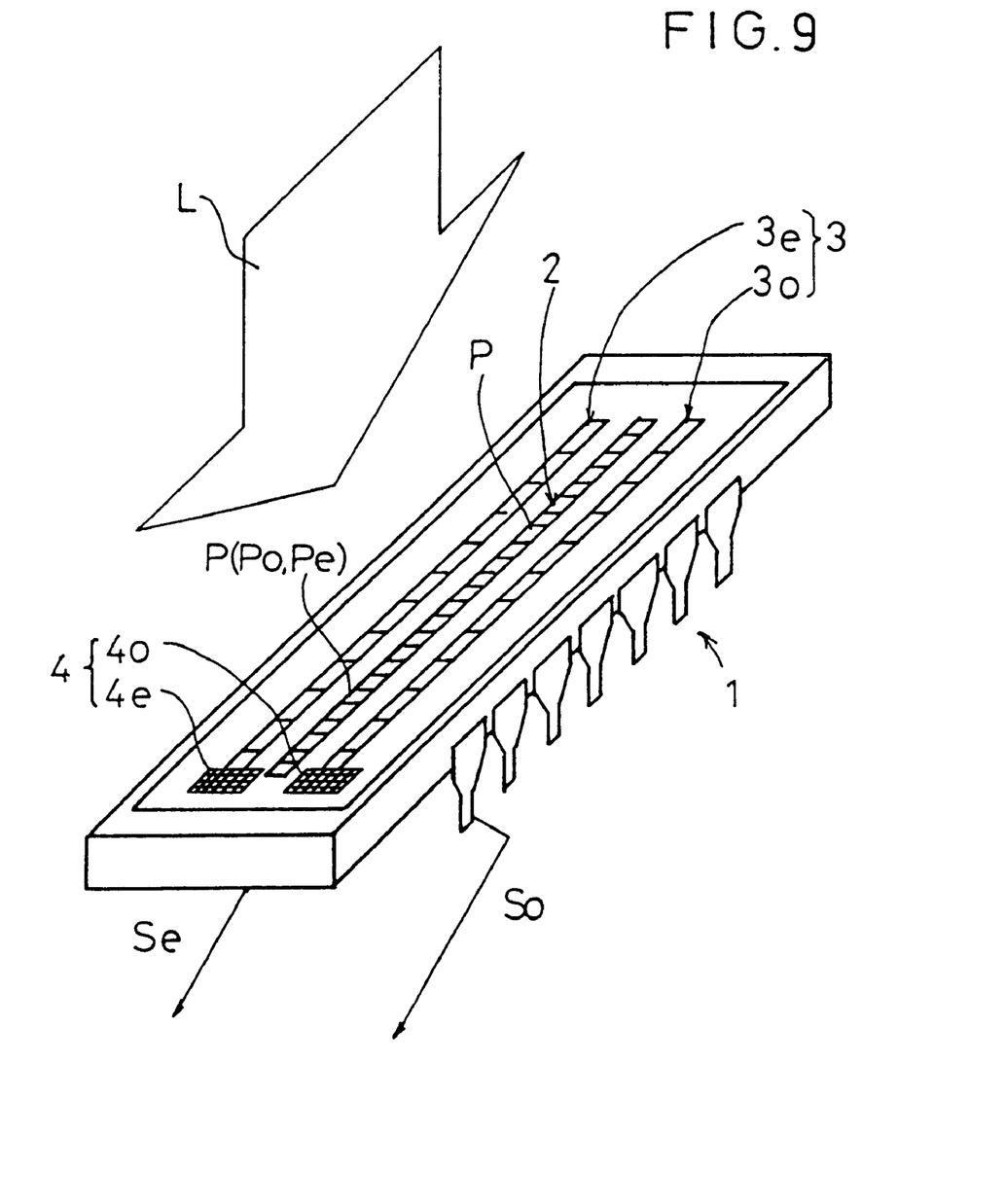
FIG. 9 is a perspective view of a general linear image sensor.

As schematically shown in FIG. 9 of the accompanying drawings, a general linear image sensor 1 basically comprises a photodetector 2 comprising a linear array of photoelectric transducer elements (hereinafter referred to as "pixels") P and a pixel transfer unit 3 comprising an odd-numbered pixel transfer array 3o and an even-numbered pixel transfer array 3e which are positioned one on each side of the photodetector 2. The pixels P include odd-numbered pixels Po and even-numbered pixels Pe.

The pixel transfer unit 3 is covered with a metal film (not shown) such as an evaporated aluminum film or the like which shields the pixel transfer unit 3 from light L.

The light L which is detected by the photodetector 2 is converted into electric charges by the respective pixels P. The electric charges are successively shifted from the odd- and even-numbered pixels Po, Pe to the corresponding odd- and even-numbered pixel transfer arrays 3o, 3e in response to shift pulses that are periodically generated at constant time intervals. Thereafter, the electric charges are outputted as odd- and even-numbered pixel signals So, Se from odd- and even-numbered output sections 4o, 4e of FDAs (floating diffusion amplifiers) or the like through respective output terminals of the linear image sensor 1.

The odd- and even-numbered pixel signals So, Se are alternately read through an amplifier and a selector switch, and then converted by an A/D (analog-to-digital) converter (not shown) to a one-line digital image signal corresponding to the photodetector 2. The one-line digital image signal is then stored in a line memory or the like.

Figure 10:
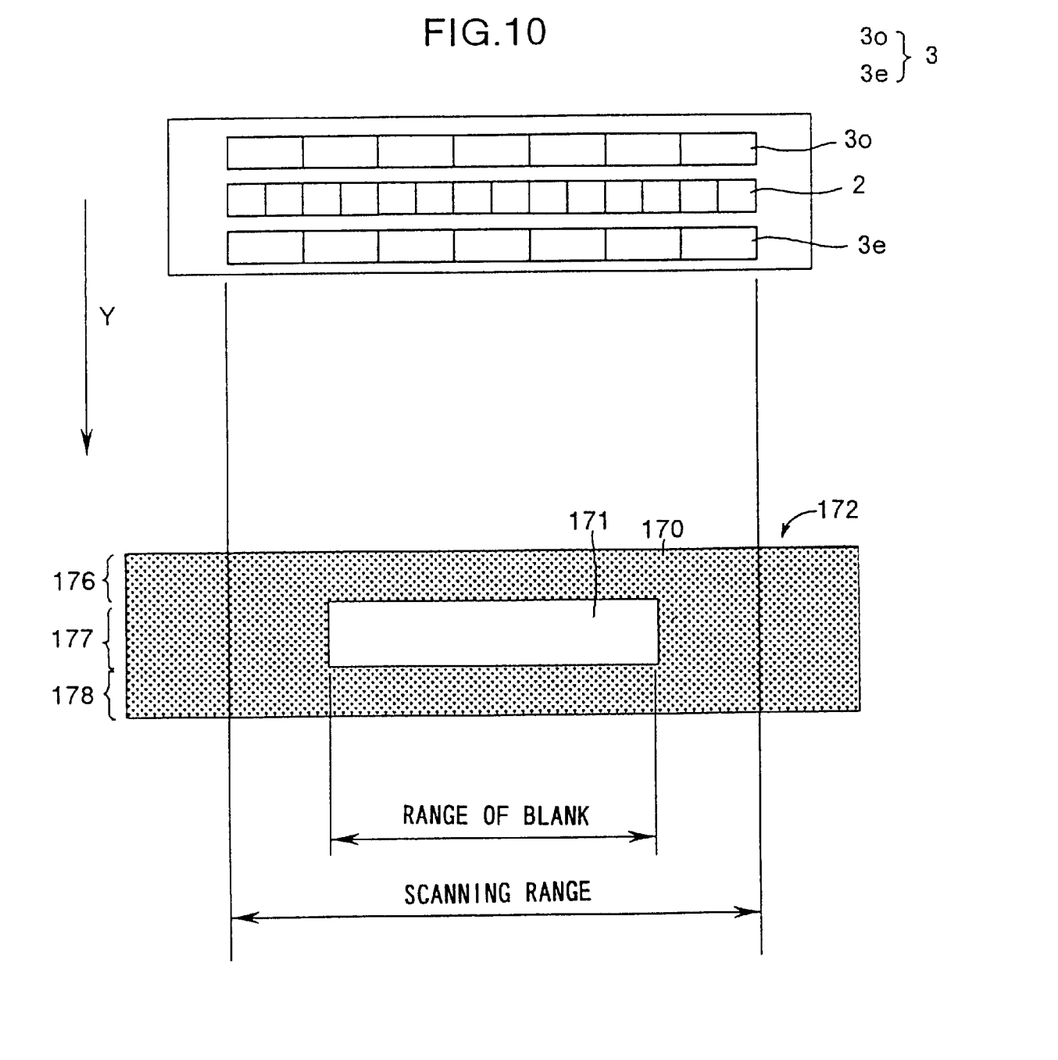
FIG. 10 is a plan view illustrative of the manner in which a subject is read by the linear image sensor shown in FIG. 9.
Figure 11A:
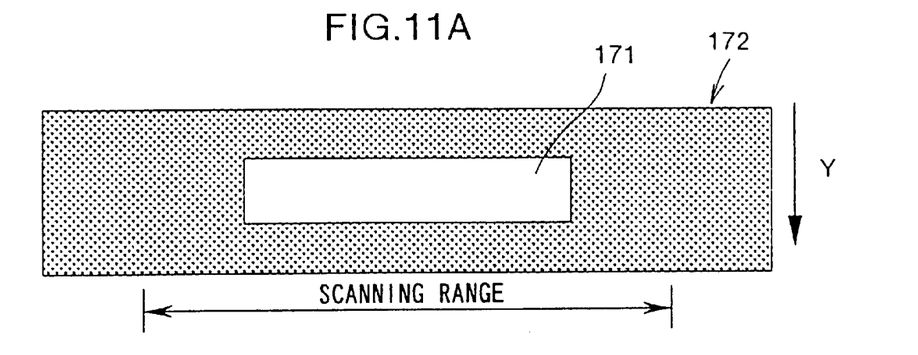
FIG. 11A is a plan view of a subject which contains a blank area in a solid area.
Figure 11B:
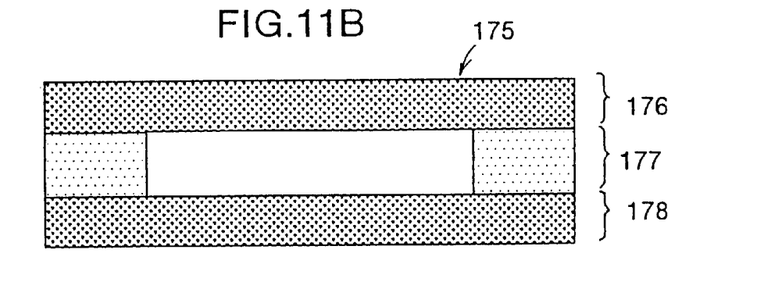
FIG. 11B is a plan view of a reproduced image of the subject shown in FIG. 11A, which is obtained when no offset level correction is carried out.

FIG. 10 of the accompanying drawings shows an application in which the linear image sensor 1 reads a subject 172 in a scanning range as shown while moving relatively to the subject 172 in an auxiliary scanning direction indicated by the arrow Y. The subject 172 has a peripheral solid area 170 having a high-density color such as black and a central blank area 171. An image 175 (see FIG. 11B of the accompanying drawings) of the subject 172 represented by an image signal produced by the linear image sensor 1 includes a front side area 176 and a rear side area 178, which are positioned forwardly and rearwardly, respectively, of the blank area 171 with respect to the auxiliary scanning direction. The front and rear side areas 176, 178, in which each line in the main scanning direction is contained in the peripheral solid area 170, have their density corresponding to the density of the peripheral solid area 170. However, a central area 177 of the image 175, which contains the blank area 171 in the main scanning direction, has its density reduced in regions corresponding to the peripheral solid area 170.

As a result of an analysis of the above problem, the inventor has found that when the linear image sensor 1 reads the central area 177 containing the blank area 171 in the main scanning direction one line by one line, the light L slightly enters the pixel transfer unit 3 covered with the metal film, producing electric charges in the pixel transfer unit 3, and a noise signal due to the produced electric charges is added as an offset to the pixel signal which has been generated by the photodetector 2.

SUMMARY OF THE INVENTION

It is therefore an object of the present invention to provide a method of and an apparatus for correcting an offset level of a linear image sensor by canceling out the offset level when the linear image sensor reads a high-density subject which contains a blank area therein.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The present invention will be described below with reference to FIGS. 1 through 8. Those parts of FIGS. 1 through 8 which are identical to those shown in FIGS. 9 through 11A, 11B are denoted by identical reference numerals and representations, and will not be described in detail below. FIGS. 9 through 11A, 11B will also be referred to when necessary in the description of the present invention.

Figure 1:
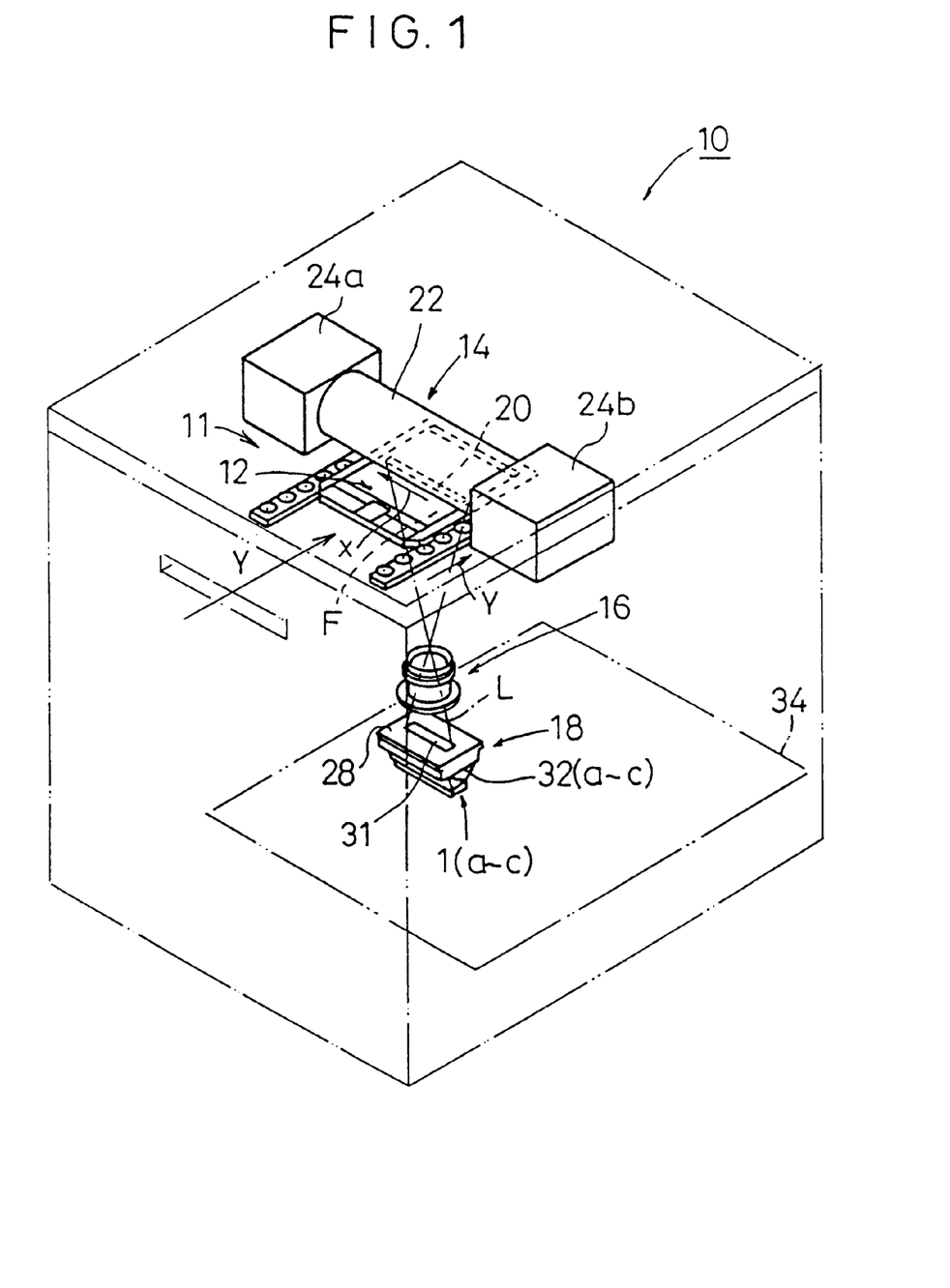
FIG. 1 is a perspective view of an image reading system to which the present invention is applied.

FIG. 1 schematically shows an image reading system 10 to which the present invention is applied. The image reading system 10 has a feed mechanism 11 which moves a subject cassette 12 in the direction indicated by the arrow Y (auxiliary scanning direction Y) and an illuminating optical system (illuminating light source) 14 which applies illuminating light to the subject cassette 12 in the direction indicated by the arrow X (main scanning direction X or line direction X). Image information recorded on a transmissive subject F which is carried by the subject cassette 12 is carried by transmitted light L, which is focused by a focusing optical system 16 comprising a plurality of converging lenses onto a focusing unit 18. The focusing unit 18 converts the focused light L to an electric signal.

The illuminating optical system 14 comprises a cylindrical diffusion chamber 22 having an inner light diffusion surface and a longitudinal slit 20, and a pair of light sources 24a, 24b mounted on the respective opposite ends of the cylindrical diffusion chamber 22 and each comprising a halogen lamp or the like.

The focusing unit 18 comprises a plurality of prisms 32a~32c mounted on a lower surface of a base 28 having a slit 31 defined therein. The prisms 32a~32c serve to separate the transmitted light into lights R, G, B. Linear image sensors 1a~1c in the form of CCDs are fixed as photoelectric transducers to the respective prisms 32a~32c. Each of the linear image sensors 1a~1c is basically of the same structure as the linear image sensor shown in FIG. 9. In the illustrated embodiment, one line of the photodetector 2 of each of the linear image sensors 1a~1c has N (=7500) photoelectric transducer elements or pixels. Therefore, each of the linear image sensors 1a~1c includes an odd-numbered pixel transfer array 3o of 3750 odd-numbered transfer elements and an even-numbered pixel transfer array 3e of 3750 even-numbered transfer elements.

Odd- and even-numbered pixel signals So, Se outputted from the linear image sensors 1a~1c are supplied through a flexible printed circuit to a signal processing board 34.

The linear image sensors 1a~1c effect an identical process of offset level correction as described below. The linear image sensors 1a~1c will therefore be referred to collectively as a linear image sensor 1 unless they should separately be described.

Figure 2:
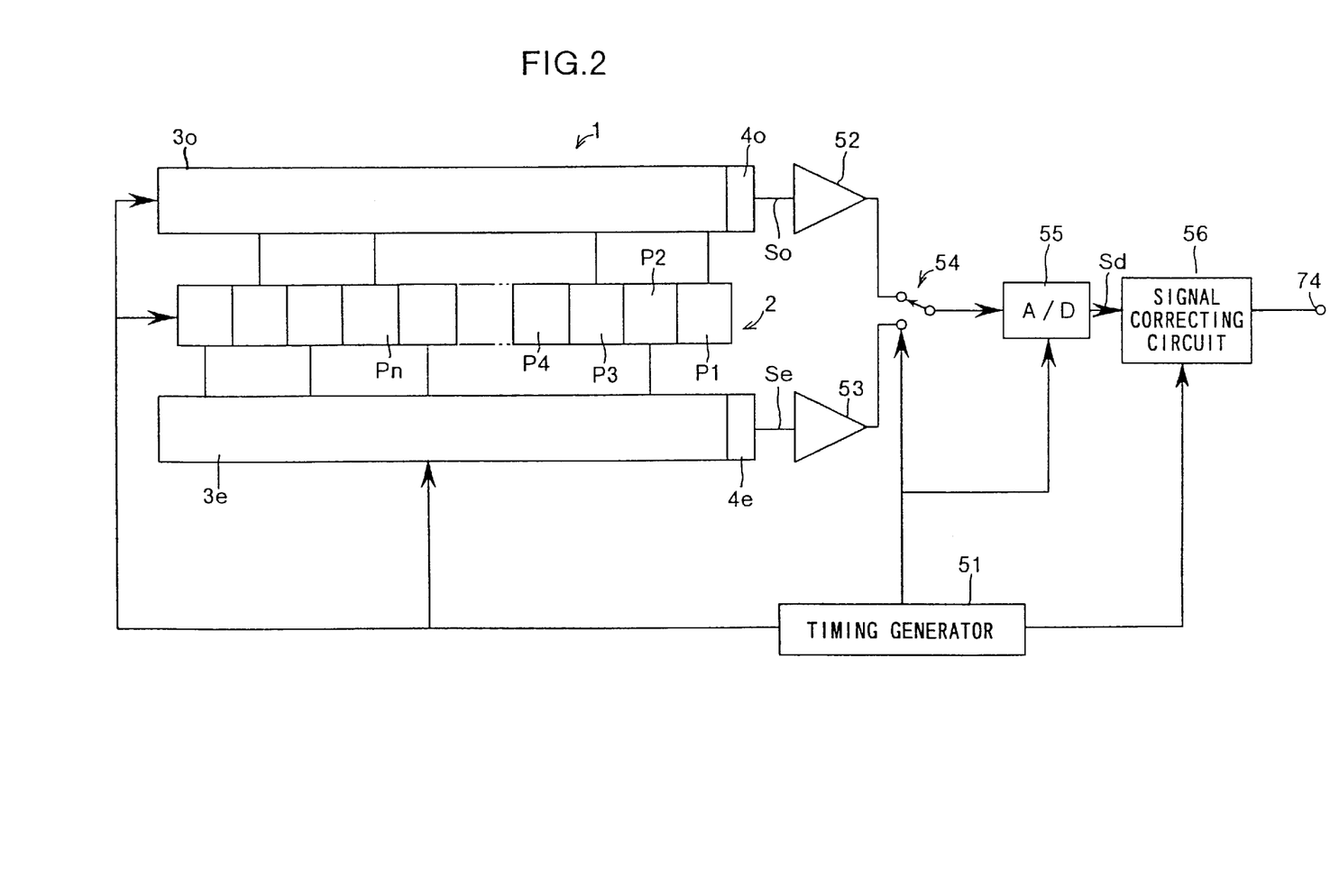
FIG. 2 is a block diagram of an offset correcting apparatus according to a first embodiment of the present invention.

FIG. 2 schematically shows the linear image sensor 1 of the focusing unit 18 and an offset correcting apparatus according to a first embodiment of the present invention for correcting an offset level of the odd- and even-numbered pixel signals So, Se that are outputted from the linear image sensor 1.

As shown in FIG. 2 (see also FIG. 9), the transmitted light which carries the image information detected by the photodetector 2 is converted by the photoelectric transducer pixels P into electric charges, which are successively shifted from the odd- and even-numbered pixels P (P1, P2, P3, P4, . . . ) to the corresponding odd- and even-numbered pixel transfer arrays 3o, 3e in response to shift pulses that are periodically outputted from a timing generator (timing controller) 51. Thereafter, the electric charges are outputted as odd- and even-numbered pixel signals So, Se from odd- and even-numbered output sections 4o, 4e of FDAs (floating diffusion amplifiers) or the like through respective output terminals of the linear image sensor 1 in response to two-phase transfer clock pulses from the timing generator 51. As described in detail later on, after the odd- and even-numbered pixel signals So, Se corresponding to all the pixels of the linear image sensor 1 have been outputted, a plurality of transfer clock pulses are supplied from the timing generator 51 to the linear image sensor 1 to output empty-transfer-level signals from empty transfer elements of the odd- and even-numbered pixel transfer arrays 3o, 3e.

The odd- and even-numbered pixel signals So, Se and the empty-transfer-level signals are supplied through variable-gain amplifiers 52, 53 and a selector switch (multiplexer) 54, which are on the signal processing board 34, alternately in the sequence of pixels (P1, P2, . . . ) to an A/D (analog-to-digital) converter 55 having a 14-bit resolution.

The A/D converter 55 converts the odd- and even-numbered pixel signals So, Se and the empty-transfer-level signals, which are analog signals, to digital image signals (also referred to as image data or digital data) Sd that are supplied to a signal correcting circuit 56 which serves as an offset level correcting circuit.

A known CDS (correlated double signal sampling) circuit (not shown) is connected between the variable-gain amplifiers 52, 53 and the selector switch 54 for canceling out changes in remaining electric charges which are produced by the output sections 4o, 4e after being reset, thereby to supply only signals accurately representing the converted electric charges to the A/D converter 55.

For faster signal processing, A/D converters 55 may be connected parallel to each other to the output terminals of the respective variable-gain amplifiers 52, 53, and output digital signals from the A/D converters 55 may be switched by the multiplexer 54.

Figure 3:
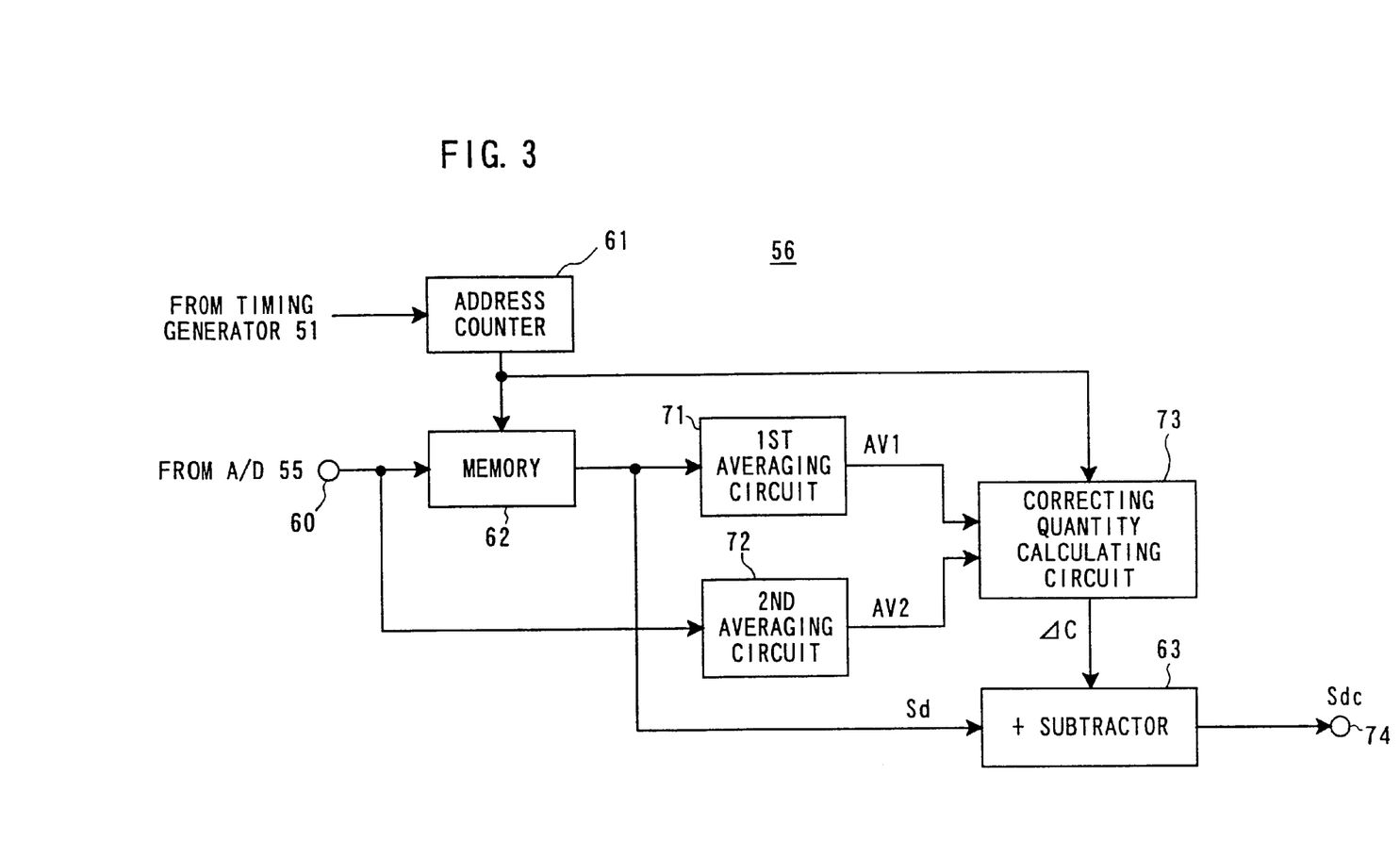
FIG. 3 is a block diagram of a signal correcting circuit of the offset correcting apparatus shown in FIG. 2.

FIG. 3 shows in detail the signal correcting circuit 56 shown in FIG. 2. The signal correcting circuit (correcting quantity calculating means) 56 shown in FIG. 3 is implemented by a PLD (programmable logic device) as an integrated circuit.

The image data Sd are supplied from the A/D converter 55 through an input port 60. The image data which correspond to all the pixels N (N=7500) of one line and α pixels are stored in a memory (memory means) 62, which may be an FIFO memory, at addresses indicated by an address counter 61 that operates in response to clock signals from the timing generator 51 under the control of a CPU (control means). The α pixels correspond to the empty-transfer-level signals, and comprise 128 pixels in the illustrated embodiment. Therefore, the memory 62 has 7500+128=7628 memory areas (memory addresses). Each of the memory areas or registers store 16-bit data.

When the memory 62 is supplied at its input terminal from the A/D converter 55 with the pixel data of a line (present line) of 7500 pixels which are presently read and the following data of 128 pixels of the present line from the 64 empty transfer elements of the odd-numbered pixel transfer array 3o and the 64 empty transfer elements of the even-numbered pixel transfer array 3e, the memory 62 supplies from its output terminal the empty-transfer-level data of 128 pixels of a preceding line (immediately prior to the pixel data of the present line of 7500 pixels) from the empty transfer elements of the odd- and even-numbered pixel transfer array 3o, 3e to a first averaging circuit (first averaging means) 71. At the same time, the empty-transfer-level data of 128 pixels of the present line are supplied to a second averaging circuit (second averaging means) 72. The image data Sd of the first pixel of the present line is supplied to a minuend input terminal of a subtractor 63.

The first averaging circuit 71 calculates first average data (average empty-transfer-level data) AV1 of the empty-transfer-level data of 128 pixels of the preceding line as an arithmetic mean thereof. The first average data AV1 is supplied to an input terminal of a correcting quantity calculating circuit (including correcting quantity calculating means, subtracting means, and proportional distribution calculating means) 73.

The second averaging circuit 72 calculates second average data (average empty-transfer-level data) AV2 of the empty-transfer-level data of 128 pixels of the present line as an arithmetic mean thereof. The second average data AV2 is supplied to another input terminal of the correcting quantity calculating circuit 73.

The correcting quantity calculating circuit 73 calculates a correcting quantity ΔC for an offset level of each of the pixels of the present line from the first average data AV1 and the second average data AV2 according to the following equation (1):

$$\Delta C = AV1 + (AV2 - AV1) \times n/N \qquad (1)$$

where n is the number of the pixel to be corrected and N is the number of all the pixels of the linear image sensor 1. The correcting quantity calculating circuit 73 supplies the calculated correcting quantity ΔC to a subtrahend input terminal of the subtractor 63.

The subtractor 63 produces at its output terminal corrected image data Sdc representing offset-level-corrected image data according to the following equation (2):

$$Sdc = Sd - \Delta C \qquad (2)$$

The above correcting operation of the correcting quantity calculating circuit 73 will be described in detail below.

Figure 4:
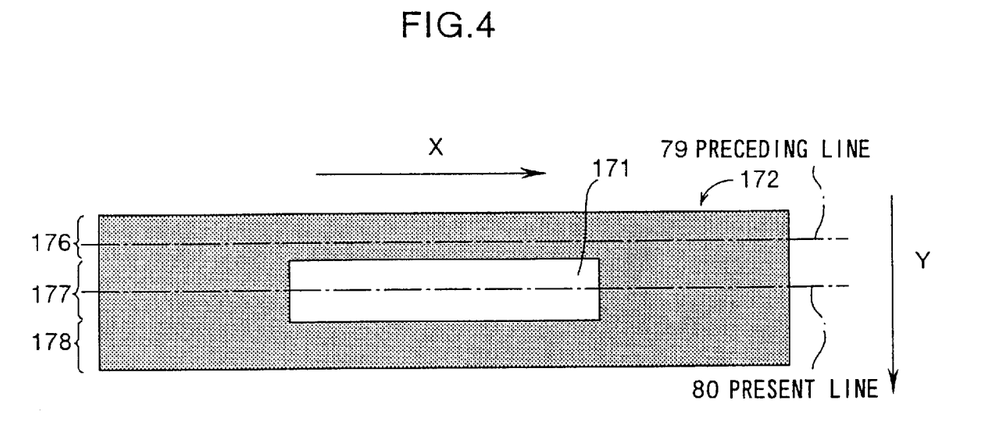
FIG. 4 is a plan view illustrative of lines along which a subject is read.

It is assumed, as shown in FIG. 4, that a preceding line 79, along which the subject 172 (see also FIG. 11A) is read, in the main scanning direction X is positioned in the peripheral solid area 170 in the front side area 176 with respect to the auxiliary scanning line Y, and a present line 80, along which the subject 172 is read, in the main scanning direction X is positioned in the central area 177 which contains the blank area 171 substantially centrally in the main scanning direction X. The present and preceding lines on the subject 172 are actually spaced apart from each other by a distance ranging from about 2 μm to 1000 μm.

While the linear image sensor 1 is relatively moved in the auxiliary scanning direction Y (actually, the subject 172 is moved in the direction opposite to the auxiliary scanning direction Y) in a scanning range as shown in FIG. 10, the linear image sensor 1 reads the subject 172.

Figure 5:
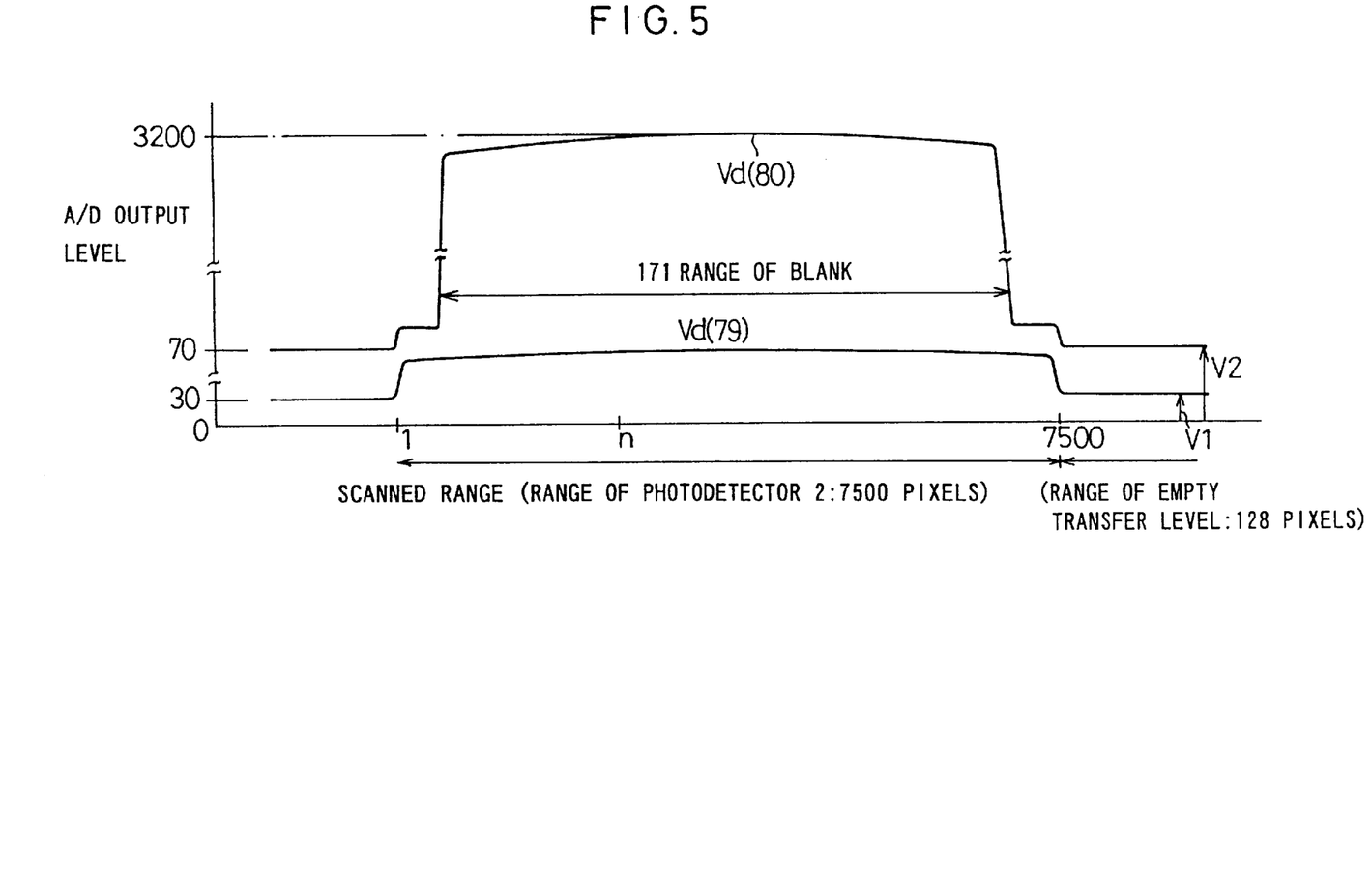
FIG. 5 is a diagram of digital level data, illustrate of operation of the signal correcting circuit shown in FIG. 3.

FIG. 5 shows digital data Vd (79) produced when all the 7500 pixels of the photodetector 2 read the preceding line 79 positioned in the solid area 170 and digital data Vd (80) produced when they read the present line 80 positioned in the central area 177 which contains the blank area 171. In FIG. 5, the vertical axis represent output levels of the A/D converter 55. The output levels of the A/D converter 55 range from 0 to 4096 levels as a 12-bit A/D converter 55 was used to plot the graph shown in FIG. 5.

After a one-line pixel signal ranging from the first pixel P1 to the final 7500th pixel is transferred, transfer clock signals for 128 pixels (64 pixels for each of the odd- and even-numbered pixel transfer arrays 3o, 3e) are supplied to output the level of the empty transfer elements of the odd- and even-numbered pixel transfer arrays 3o, 3e as an empty transfer level.

Specifically, as shown in FIG. 5, empty-transfer-level data V1 of the preceding line of 128 pixels are obtained after the digital data Vd (79) produced when the preceding line 79 is read, and empty-transfer-level data V2 of the present line of 128 pixels are obtained after the digital data Vd (80) produced when the present line 80 positioned in the central area containing the blank area 171 is read.

In plotting the graph shown in FIG. 5, the digital data Sd corresponding to the blank area 171 had a value of Sd__3200, and the average value of the empty-transfer-level data V1 of the preceding line of 128 pixels, i.e., the first average data AV1, was AV1=30, and the average value of the empty-transfer-level data V2 of the present line of 128 pixels, i.e., the second average data AV2, was AV2=70.

When these actual values for correcting an nth pixel counted from the first pixel of the present line are substituted in the equation (1), the following equation (3) is obtained:

$$\Delta C = 30 + (70 - 30) \times n/7500 \qquad (3)$$

Once the pixel number n is given, the correcting data ΔC for that pixel number n is determined, and the image data Sdc representing offset-level-corrected image data is determined by the equation (2): Sdc=Sd=ΔC.

Figure 6:
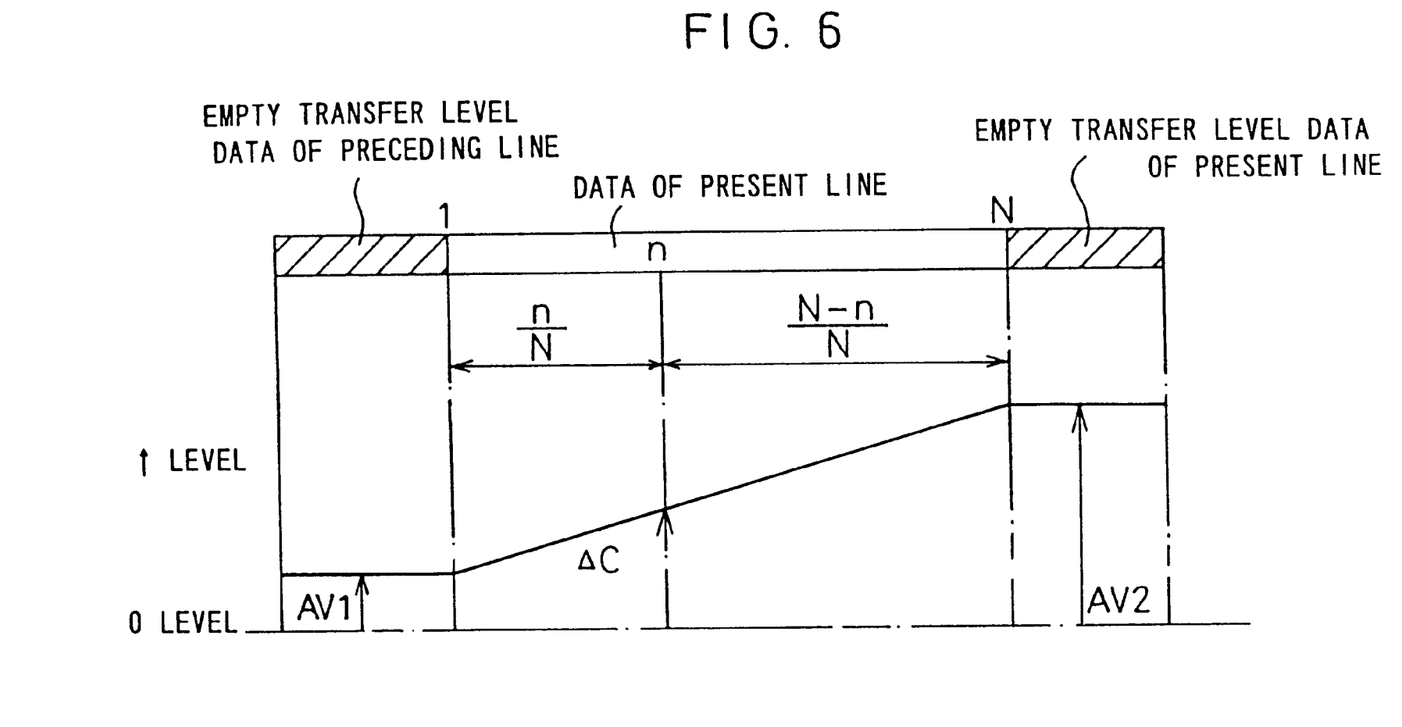
FIG. 6 is a diagram illustrative of the principles of a gradient addition process.

The correcting quantity ΔC is analyzed as follows: First, as shown in FIG. 6, the average empty-transfer-level data AV1 of the preceding line is subtracted from the average empty-transfer-level data AV2 of the present line, producing the difference (AV2−AV1).

Then, the proportional distribution (AV2−AV1)×n/D of the difference (AV2−AV1) from the first pixel P1 to the pixel Pn to be corrected, with respect to the number N of all the pixels is determined, and added to the average empty-transfer-level data AV1 of the preceding line. The sum is used as the correcting quantity ΔC. The correcting quantity ΔC for the nth pixel may be considered as an internally divided quantity between the average empty-transfer-level data AV1, AV2. The correcting quantity ΔC for the nth pixel may also be considered as a gradient additive quantity. The internal ratio is represented by n/N or (N−n)/N.

The correcting quantity ΔC thus determined by subtracted from the image data Sd corresponding to the pixel number n to be corrected of the present line for thereby producing image data Sdc which represents offset-level-corrected image data.

Based on the corrected image data Sdc, it is possible to produce an image 191 (see FIG. 11D) whose density accurately corresponds to the density of the subject 172.

As shown in FIG. 5, the empty transfer level is determined depending on the range of the blank area 171 with respect to the scanning range, i.e., the proportion of an area where the light intensity is higher than the other areas. In reality, the proportion of such a higher-intensity area to the scanning range varies from subject to subject. Therefore, the difference (V2−V1) between the offset levels varies from subject to subject. Since the gradient additive process for each line corrects image data based on actual image variations, it is particularly effective to correct image data of actual subjects.

Figure 7:
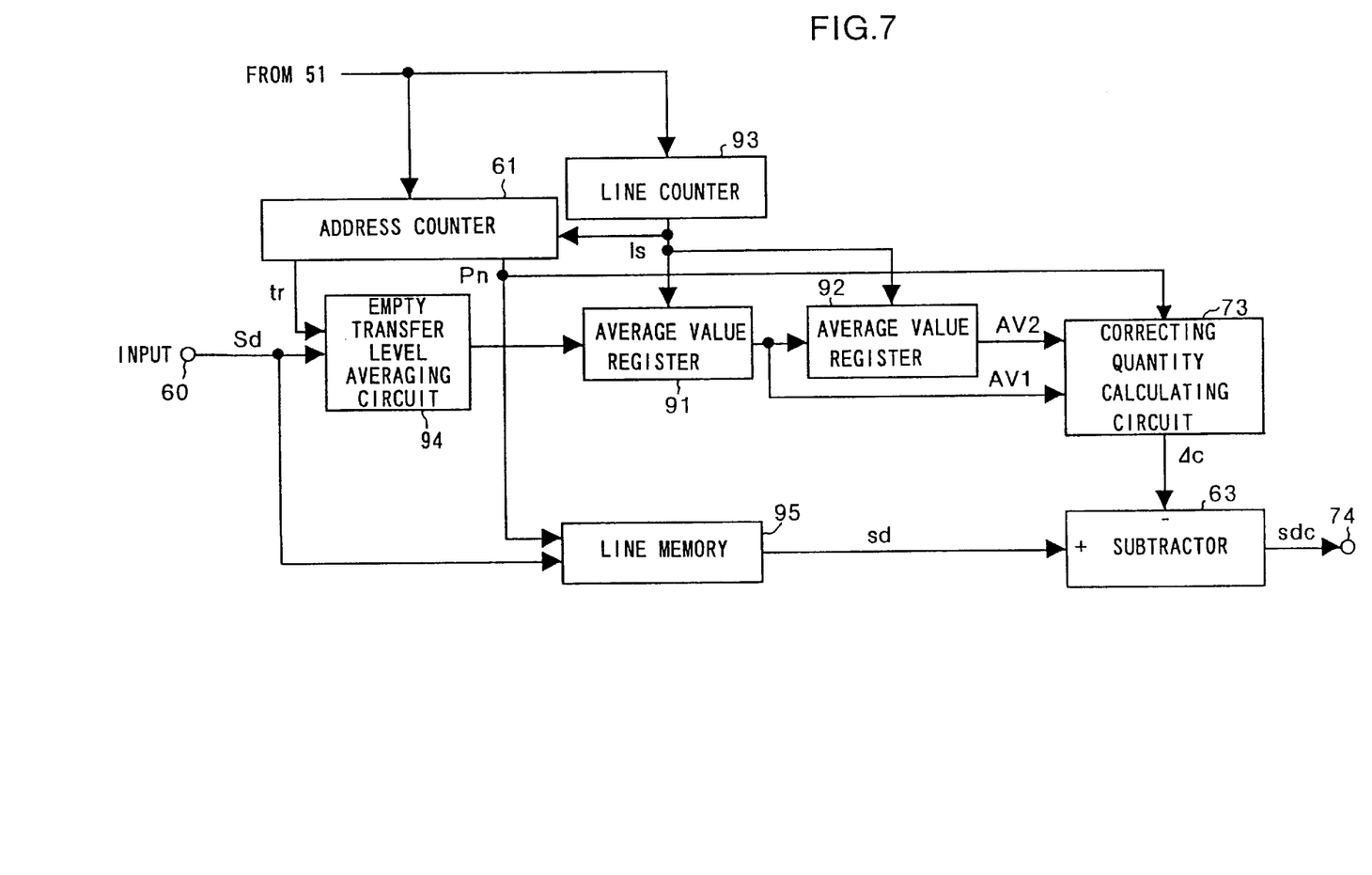
FIG. 7 is a block diagram of a signal correcting circuit according to a second embodiment of the present invention.
Figure 8:
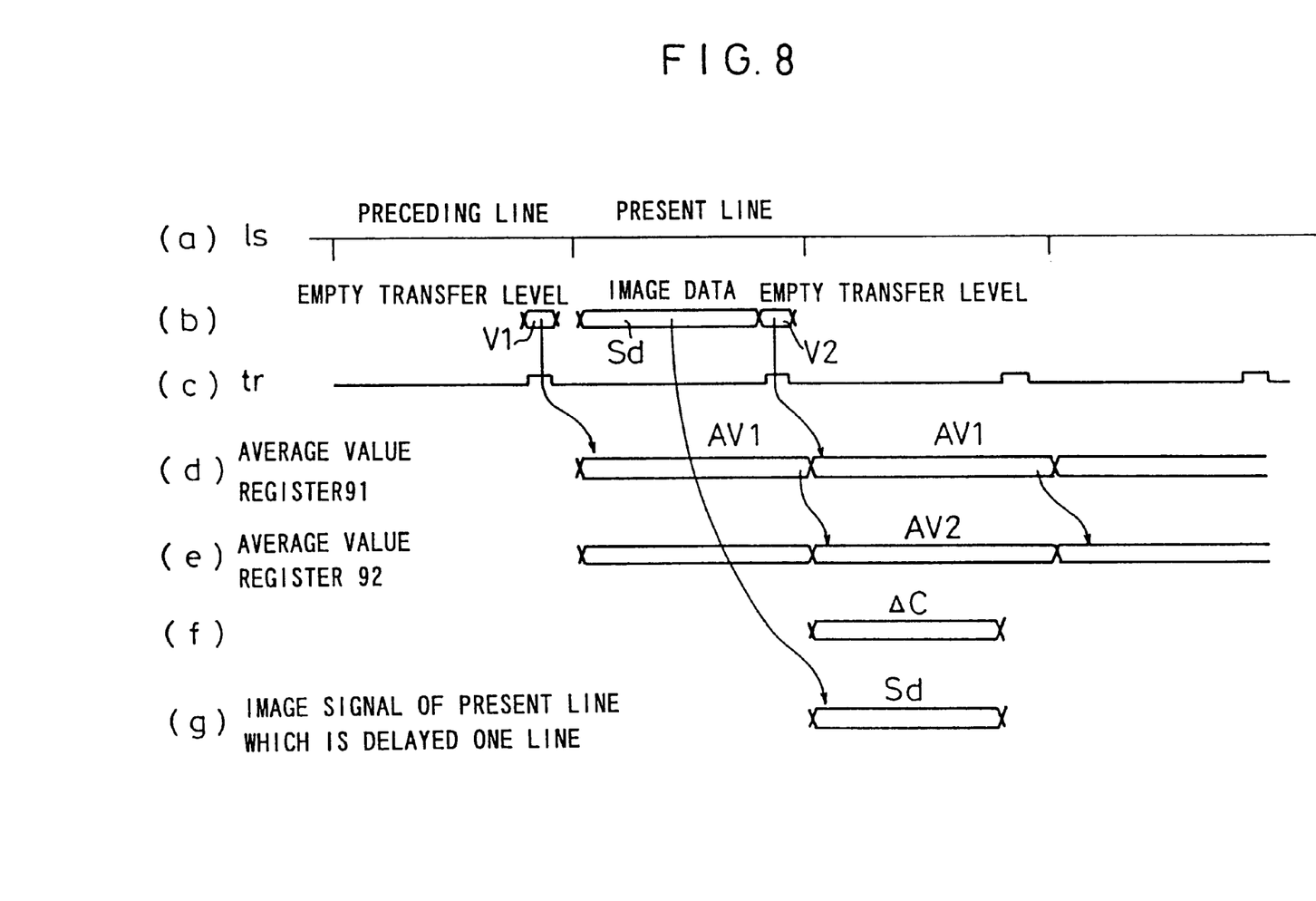
FIG. 8 is a timing chart illustrative of operation of the signal correcting circuit shown in FIG. 7.

FIG. 7 shows in block form a signal correcting circuit according to a second embodiment of the present invention. The signal correcting circuit shown in FIG. 7 is also implemented by a PLD. FIG. 8 is a timing chart illustrative of operation of the signal correcting circuit shown in FIG. 7. Those parts shown in FIGS. 7 and 8 which are identical to those shown in FIGS. 1 through 6 and 9 through 11B are denoted by identical reference numerals representations, and will not be described in detail.

In FIGS. 7 and 8, a line counter 93 generates a line synchronizing signal ls (see (a) of FIG. 8) in synchronism with one line (main scanning direction) of the linear image sensor 1 in response to a timing clock signal (basic clock signal) supplied from the timing generator 51.

An address counter 61 generates addresses corresponding to the respective pixels P of the linear image sensor 1. Each of the address values is cleared each time a line synchronizing signal ls is applied.

The address counter 61 generates a signal tr (see (b), (c) of FIG. 8) indicative of intervals corresponding to empty transfer elements and an address value Pn indicative of a pixel number.

An empty transfer level averaging circuit 94 calculates average empty-transfer-level data AV1, AV2 of the signals V1, V2 in intervals (see (b) in FIG. 8) indicated by the signal tr, once for each line.

Average value registers 91, 92 hold the average data AV1 of the preceding line and the average data AV2 of the present line. Each time a line synchronizing signal ls is applied, the average data AV1, AV2 held by the average value registers 91, 92 are transferred to following stages, i.e., the average data AV1 held by the average value register 91 is transferred to the average value register 92, and the average data AV2 held by the average value register 92 is transferred to a correcting quantity calculating circuit 73 (see (d), (e) of FIG. 8).

The correcting quantity calculating circuit 73 calculates the correcting quantity $\Delta C$ according to the equation (1) on a real-time basis for each pixel (see (f) of FIG. 8).

A line memory 95 comprises an FIFO memory for storing the image data Sd of the present line (see (g) of FIG. 8). The line memory 95 may be considered as a one-line delay circuit.

A subtractor 63 calculates the corrected data Sdc of each pixel of the present line according to the equation (2):

$$Sdc = Sd - \Delta C.$$

If the A/D converter 55 has a 14-bit resolution corresponding to the dynamic range of the linear image sensor 1, then it is possible to fully cancel out an offset shift which is generated when a high-density subject containing a blank area is read, with the signal correcting circuits according to the first and second embodiments of the present invention.

Actually, as shown in FIG. 9, a distance corresponding to about one line exists between the photodetector 2 and each of the odd-numbered pixel transfer array 3o and the even-numbered pixel transfer array 3e. Strictly speaking, therefore, there is a difference in time between the odd-numbered pixels Po and the even-numbered pixels Pe until they reach the blank area 171. It is thus necessary to change lines of empty transfer levels used for correcting an offset level. For example, if, as shown in FIG. 10, the even-numbered pixel transfer array 3e is positioned in front of the photodetector 2 in the auxiliary scanning direction Y and the odd-numbered pixel transfer array 3o is positioned behind the photodetector 2 in the auxiliary scanning direction Y, then a correcting quantity is determined for the even-numbered pixels Pe by the gradient additive process with respect to the offset levels of the empty-transfer-level data of the present and preceding lines and a correcting quantity is determined for the odd-numbered pixels Po by the gradient additive process with respect to the offset levels of the empty-transfer-level data of the present line and a line which is one line behind the present line. In this manner, offset shifts can be corrected with greater accuracy with respect to image sensors of greater dynamic ranges.

With the present invention, as described above, a correcting quantity for an offset level of pixel signals of a certain line is determined based on a gradient additive process with respect to empty-transfer-level data of the certain line and empty-transfer-level data of a line which precedes the certain line. Therefore, even if there is a sudden image level change between the pixel signals of the certain line and the pixel signals of the preceding line, a change in the offset level, i.e., an offset shift, can effectively be corrected in response to such a sudden image level change.

Particularly, an offset shift generated when a high-density subject containing a blank area is read can be canceled out to the extent that cannot visually be recognized on a reproduced image.

For higher accuracy, different lines of empty transfer levels used for correcting an offset level may be used by odd-numbered pixels and even-numbered pixels Specifically, for pixels relative to a pixel transfer array positioned in front of the photodetector in the auxiliary scanning direction, a correcting quantity may be determined by the gradient additive process with respect to empty transfer levels of a preceding line and a present line, and for pixels relative to a pixel transfer array positioned behind the photodetector in the auxiliary scanning direction, a correcting quantity may be determined by the gradient additive process with respect to empty transfer levels of the present line and a line which is one line behind the present line.

An offset shift may be corrected using the levels of dummy pixels connected to the photodetector of a linear image sensor, rather than the empty transfer levels of the linear image sensor. If the dummy pixels are used to correct an offset shift, however, since only several dummy pixels are included per line and the number of dummy pixels used is small, average levels tend to vary greatly, and the accuracy of the correcting process is relatively low. If the accuracy of the correcting process is to be increased, then it is necessary to increase the number of correcting pixels, and it has been found that the average value of data from the dummy pixels of several lines in front of and behind a line to be corrected may be used.

Figure 11C:
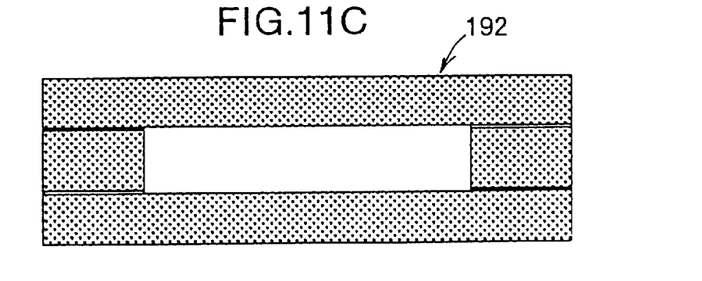
FIG. 11C is a plan view of a reproduced image of the subject shown in FIG. 11A, which is obtained when offset level correction is carried out using several front and area lines of dummy pixels.
Figure 11D:
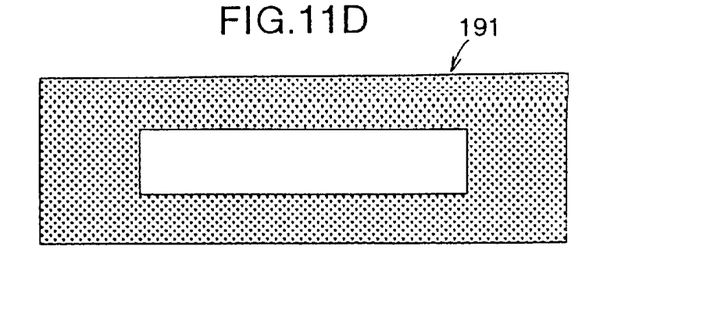
FIG. 11D is a plan view of a reproduced image of the subject shown in FIG. 11A, which is obtained when offset level correction is carried out according to the present invention.

However, when an offset shift is corrected using the average value of data from the dummy pixels of several lines in front of and behind a line to be corrected, an image 192 (see FIG. 11C) is generated which includes a high-density area due to excessive correction and a low-density area due to insufficient correction upon a transition from the solid area to the blank area. If the signal processing system has a 10-bit gradation range, rather than the 14-bit gradation range as illustrated, with respect to the resolution of the A/D converter, then a reproduced image suffers no such density irregularities upon a transition from the solid area to the blank area (like the image 191 shown in FIG. 11D) even when an offset shift is corrected using the average value of data from the dummy pixels of several lines in front of and behind a line to be corrected. If, however, the dynamic range of the linear image sensor increases for the reproduction of higher-gradation, finer images, then reproduced images are subject to image irregularities as shown in FIG. 11C.

The inventor of the present application had paid attention to and employed data, i.e., empty-transfer-level data, which are produced when transfer clock pulses are successively supplied after the data of photoelectric transducer elements (7500 photoelectric transducer elements in the illustrated embodiments) are transferred.

The number of empty-transfer-level data (the number of pixels) can be increased as long as transfer clock pulses are successively applied. For increasing the accuracy of the correcting process, more empty transfer levels may be averaged in order to absorb variations in the pixels of the empty transfer levels. It has been found that actually use of the empty transfer levels of at least 64 pixels is effective to correct an offset level to a considerable extent in view of the ease with which calculations can be effected in terms of the binary notation. In the illustrated embodiments, the empty transfer levels of 128 pixels are employed.

Although certain preferred embodiments of the present invention has been shown and described in detail, it should be understood that various changes and modifications may be made therein without departing from the scope of the appended claims.

What is claimed is:

1. A method of correcting an offset level of a pixel signal outputted from a linear image sensor having a pixel transfer array disposed along a photodetector, comprising the steps of:

outputting as empty transfer levels signal levels produced when transfer clock pulses are successively applied to the pixel transfer array after one line of pixel signals is transferred from said photodetector through said pixel transfer array; and determining a correcting quantity of a given pixel of a predetermined line by determining a difference produced when an empty transfer level of a line preceding said predetermined line is subtracted from an empty transfer level of said predetermined line, determining a proportional distribution of said difference from a first pixel to said given pixel with respect all pixels of said predetermined line, and adding said proportional distribution to the empty transfer level of the line preceding said predetermined line, thereby producing said correcting quantity.

2. A method according to claim 1, wherein a subject to be read by said image sensor includes a peripheral solid area and a central blank area surrounded by said peripheral solid area.

3. A method according to claim 1, wherein each of said empty transfer level of said predetermined line and said empty transfer level of the line preceding said predetermined line comprises an average value of a plurality of empty transfer levels.

4. A method according to claim 3, wherein said empty transfer levels comprise empty transfer levels of at least 64 pixels.

5. A method according to claim 3, wherein said empty transfer levels comprise empty transfer levels of 128 pixels.

6. A method of correcting an offset level of a pixel signal of a line outputted from a linear image sensor having odd- and even-numbered pixel transfer arrays disposed one on each side of and extending along a photodetector, when the linear image sensor is linearly moved in an auxiliary scanning direction perpendicular to said line, comprising the steps of:

outputting as empty transfer levels signal levels produced when transfer clock pulses are successively applied to the pixel transfer arrays after one line of pixel signals is transferred from said photodetector alternately through said odd- and even-numbered pixel transfer arrays;

determining a first correcting quantity of a given pixel of a predetermined line with respect to one of the odd- and even-numbered pixel transfer arrays which is positioned in front of the photodetector in said auxiliary scanning direction, by determining a first difference produced when an empty transfer level of a line preceding said predetermined line is subtracted from an empty transfer level of said predetermined line, determining a first proportional distribution of said difference from a first pixel to said given pixel with respect all pixels of said predetermined line, and adding said first proportional distribution to the empty transfer level of the line preceding said predetermined line, thereby producing said first correcting quantity; and determining a second correcting quantity of a given pixel of a predetermined line with respect to the other of the odd- and even-numbered pixel transfer arrays which is positioned behind the photodetector in said auxiliary scanning direction, by determining a second difference produced when an empty transfer level of said predetermined line is subtracted from an empty transfer level of a line which is one line behind said predetermined line, determining a second proportional distribution of said difference from a first pixel to said given pixel with respect all pixels of said predetermined line, and adding said second proportional distribution to the empty transfer level of the line which is one line behind said predetermined line, thereby producing said second correcting quantity.

7. A method according to claim 6, wherein a subject to be read by said image sensor includes a peripheral solid area and a central blank area surrounded by said peripheral solid area.

8. A method according to claim 6, wherein each of said empty transfer level of said predetermined line and said empty transfer level of said line which is one line behind said predetermined line comprises an average value of a plurality of empty transfer levels.

9. A method according to claim 8, wherein said empty transfer levels comprise empty transfer levels of at least 64 pixels.

10. A method according to claim 8, wherein said empty transfer levels comprise empty transfer levels of 128 pixels.

11. An apparatus for correcting an offset level of a linear image sensor, comprising:

a linear image sensor having a pixel transfer array disposed along a photodetector comprising a linear array of pixels, for outputting an image signal from said photodetector through said pixel transfer array;

a timing controller for outputting as empty transfer levels signal levels produced when transfer clock pulses are successively applied to the pixel transfer array after one line of pixel signals is transferred from said photodetector through said pixel transfer array;

correcting quantity calculating means for being successively supplied with pixels signals of said one line and said empty transfer levels and calculating a correcting quantity for each pixel; and correcting means for correcting the pixel signal of each pixel with the correcting quantity for each pixel calculated by said correcting quantity calculating means;

said correcting means comprising:

memory means for storing pixel signals of a predetermined line;

memory means for storing an empty transfer level of a line preceding said predetermined line;

memory means for storing an empty transfer level of said predetermined line;

subtracting means for determining a difference by subtracting the empty transfer level of the line preceding said predetermined line from the empty transfer level of said predetermined line;

proportional distribution calculating means for determining a proportional distribution of said difference from a first pixel to said each pixel with respect to all pixels of said predetermined line; and combining means for combining said proportional distribution with said empty transfer level of said predetermined line thereby to calculate said correcting quantity.

12. An apparatus according to claim 11, wherein a subject to be read by said image sensor includes a peripheral solid area and a central blank area surrounded by said peripheral solid area.

13. An apparatus according to claim 11, wherein said linear image sensor comprises a CCD linear image sensor.

14. An apparatus according to claim 11, wherein said correcting quantity calculating means has averaging means for determining average levels of plural empty transfer levels respectively as said empty transfer level of said predetermined line and said empty transfer level of the line preceding said predetermined line.

15. An apparatus according to claim 14, wherein said empty transfer levels comprise empty transfer levels of at least 64 pixels.

16. An apparatus according to claim 14, wherein said empty transfer levels comprise empty transfer levels of 128 pixels.

* * * * *